United States Patent
Lange et al.

(10) Patent No.: US 6,567,747 B1
(45) Date of Patent: May 20, 2003

(54) LIGHT BAR WITH TILT SENSOR

(75) Inventors: Arthur F. Lange, Sunnyvale, CA (US);
Michael Timmons, Pacifica, CA (US);
Dominic Farmer, Milpitas, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/411,026

(22) Filed: Oct. 4, 1999

(51) Int. Cl.$^7$ ................................................ G01C 21/20
(52) U.S. Cl. ...................... 701/213; 701/211; 340/440
(58) Field of Search ............................... 701/213, 211, 701/214, 220, 41, 50, 23; 180/167, 41; 340/689, 440; 342/357.01, 357.17, 357.14, 357.11

(56) References Cited

U.S. PATENT DOCUMENTS

| | | | | |
|---|---|---|---|---|
| 5,717,593 A | * | 2/1998 | Gvili ........................... | 701/207 |
| 5,755,382 A | * | 5/1998 | Skotinkov .................... | 239/161 |
| 5,924,516 A | * | 7/1999 | Sagaser et al. ............. | 180/333 |
| 5,945,917 A | * | 8/1999 | Harry ..................... | 340/815.45 |
| 5,987,383 A | * | 11/1999 | Keller et al. ................ | 701/213 |
| 6,104,979 A | * | 8/2000 | Fowler et al. .............. | 701/208 |
| 6,128,076 A | * | 10/2000 | Sackett ....................... | 356/249 |

* cited by examiner

Primary Examiner—Tan Nguyen
(74) Attorney, Agent, or Firm—Wagner, Murabito & Hao LLP (57) ABSTRACT

The present invention is drawn to a light bar assembly for guiding the movement of a vehicle on a tilted surface. The light bar assembly is comprised of a housing having a light bar and a tilt sensor. The light bar is disposed in the housing and adapted to guide the movement of the vehicle. In addition, the tilt sensor is disposed in the housing and adapted to indicate the attitude of the vehicle. As such, the attitude of the vehicle is taken into consideration when the vehicle is being guided along the adjusted travel path on the tilted surface. Moreover, with the addition of the light bar assembly, an existing prior art guidance control system can be conveniently and economically upgraded to a robust system that includes the tilt sensor.

16 Claims, 14 Drawing Sheets

LIGHT BAR WITH TILT SENSOR

FIELD OF THE INVENTION

The present invention relates to vehicle guidance control systems. More particularly, the present invention relates to a guidance control system that includes a light bar assembly.

BACKGROUND

Tractors and other vehicles used in farming operations must be operated precisely to obtain uniform rows during planting and to harvest crops efficiently. Typically, tractors used for planting rows of crops are operated manually by an operator who drives the tractor along each row to be planted. The operator must be very careful in order to get uniform rows of planted crops. It is difficult for an operator of a tractor to maintain precise positioning of the tractor relative to rows which have already been planted.

In an attempt to make the job of planting easier on the operator, manufacturers of tractors and other vehicles have recently attempted to use automated guidance control systems. These guidance control systems typically include a Global Positioning System (GPS) for determining position.

One particular helpful use of GPS is in guiding a vehicle to move on a predetermined path for planting crops. This predetermined path runs through consecutively placed rows. Specifically, the center line of this predetermined path coincides with the center lines of these rows.

In one prior art approach, a guidance control system is used that includes a visible display. The operator of the vehicle manually directs the vehicle in accordance with the visible display to guide a vehicle along a predetermined path. However, the predetermined path often lies over terrain that is tilted. In this scenario, the tilted surface introduces at least two complications (errors) in guiding the vehicle.

The first error caused by the tilted surface is the tilting of the GPS antenna. That is, when traveling over a tilted surface, the vehicle itself is not directly over the center of a row, even though the tip of the GPS antenna is directly over the center of a row. Thus, the vehicle is not properly positioned. As a result, by following the predetermined path on the tilted surface, the vehicle actually travels off of the center line of the row.

The second error caused by the tilted surface is the shortening of "vertically viewed" path width. Specifically, the vertically viewed path width refers to the path's width as viewed vertically straight down from a high vantage point. On a flat surface, the vertically viewed path width for a vehicle traveling along a predetermined path coincides with the width of each row. However, on a surface tilting in a perpendicular direction to a path (i.e., lateral tilting), the path's vertically viewed path width does not coincide with the width of each row. Thus, on the tilted surface, the vehicle is being guided to travel on the predetermined path that deviates from the desired path width.

In one recent prior art guidance control system, a tilt sensor is used to compensate for the above two tilting errors. The tilt sensor is typically contained within a separate housing that is coupled to a control unit via a cable. The control unit is coupled via cables to a visual display and a GPS.

However, prior art systems that include a tilt sensor that couples to a control unit require an extra serial port to accommodate the tilt sensor. In view of the need for competitive pricing, the serial port is costly to implement. Moreover, using cables to couple the tilt sensor to the control unit exposes the entire guidance control system to extra electrical noise. This electrical noise can be especially problematic for the intended outdoor use of the guidance control system for agricultural purposes.

In another recent prior art guidance control system, a tilt sensor is also used to compensate for the above two tilting errors. In particular, the tilt sensor is integrated directly inside of a control unit. The control unit in turn is coupled via cable to a visual display and is coupled via a cable to a GPS.

By integrating the tilt sensor with the control unit, this prior art approach avoids the need to include extra serial ports and cables to accommodate a stand alone tilt sensor. However, integrating the tilt sensor with the control unit requires modification of the control unit that is costly to implement. In addition, for users who have already purchased a control unit not fitted with any tilt sensor, it is costly to buy a new control unit solely for the purpose of getting the benefits provided by the tilt sensor. For the above reasons, these prior art guidance control systems fitted with tilt sensors are typically expensive and difficult to implement.

Thus, a need exists for incorporating a tilt sensor into a guidance control system that does not require creation of extra serial port to accommodate the tilt sensor. Moreover, a need exists for incorporating a tilt sensor into a guidance control system that does not require the tilt sensor to couple to the control unit using a dedicated cable that introduces extra electric noise. Furthermore, a need exists for incorporating a tilt sensor into a guidance control system that does not require costly modification of the control unit. Finally, a need exists for incorporating a tilt sensor into a guidance control system that does not require a user to replace an existing control unit.

SUMMARY

The present invention is drawn to a light bar assembly for guiding the movement of a vehicle. The light bar assembly includes a tilt sensor for accurately guiding the movement of the vehicle on a tilted surface. In particular, when the vehicle travels on the tilted surface, the present invention compensates for the error caused by the tilt of a GPS antenna coupled to the vehicle.

In one embodiment of the present invention, a light bar assembly is described for guiding a vehicle. The light bar assembly includes a light bar and a tilt sensor. The light bar assembly also includes a housing. The light bar is disposed in the housing and guides the movement of the vehicle. That is, the light bar indicates changes to the travel path of the vehicle. The operator then moves the vehicle in the indicated direction. The tilt sensor is also disposed in the housing. The tilt sensor measures the attitude of the vehicle. The attitude of the vehicle is taken into consideration for determining the travel path to be indicated while traveling over a tilted surface. Thus, notwithstanding the tilted surface, the vehicle being guided advantageously avoids deviating from the true path intended.

In another instance, the present invention is embodied as a guidance control system for controlling a vehicle's movement. The guidance control system includes a Position Determination System (PDS). The guidance control system includes a light bar assembly. The light bar assembly includes a light bar and a tilt sensor. The PDS is adapted to determine the position of the vehicle. The light bar is adapted for guiding the vehicle to move on a path. The tilt sensor measures the attitude of the vehicle. The guidance control system also includes a control unit that is coupled to the light bar assembly. Specifically, using the lateral tilt angle of the vehicle as determined by the tilt sensor, the control unit indicates an adjusted travel path for the vehicle to compensate for errors caused by the tilted surface. Thus, notwithstanding the tilted surface, the vehicle being guided along the adjusted travel path advantageously avoids deviating from the true path intended.

As implemented in these embodiments, the present invention advantageously avoids fitting an extra serial port devoted to the tilt sensor, as is required in prior art systems that include a tilt sensor. Moreover, the present invention advantageously avoids the electric noise from coupling the tilt sensor to the control unit using a dedicated cable, as occurs in prior art systems that include a tilt sensor. In addition, the present invention advantageously avoids costly modification needed for internalizing the tilt sensor into the control unit. Moreover, the present invention advantageously offers a convenient and inexpensive upgrade for an existing system having no tilt sensor.

These and other objects and advantages of the present invention will no doubt become obvious to those of ordinary skill in the art after having read the following detailed description of the preferred embodiments which are illustrated in the various drawing figures.

BRIEF DESCRIPTION OF THE FIGURES

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Figure 1:
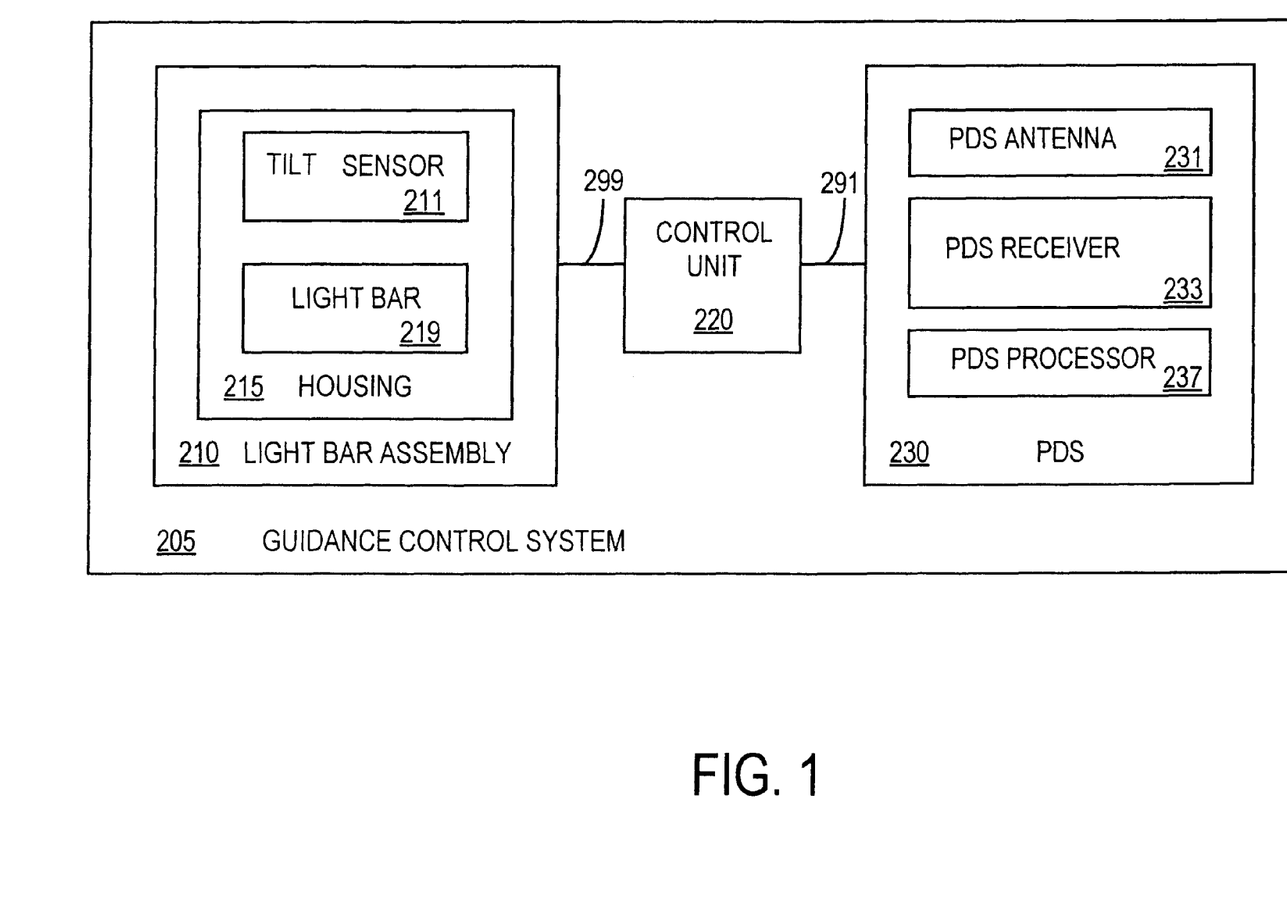
FIG. 1 is a schematic diagram depicting a guidance control system that includes a light bar assembly in accordance with one embodiment of the present invention.

With reference to FIG. 1, a guidance control system 205, according to one embodiment of the present invention, is presented. In particular, FIG. 1 depicts a way of incorporating a tilt sensor 211 into guidance control system 205. Guidance control system 205 includes a light bar assembly 210, a control unit 220, and a PDS 230.

Continuing with FIG. 1, control unit 220 is coupled to Position Determining System (PDS) 230 via cable 291. PDS 230 includes a PDS antenna 231, a PDS receiver 233 and a PDS processor 237. Control unit 220 is coupled to light bar assembly 210 via cable 299. Furthermore, light bar assembly 210 includes a housing 215, tilt sensor 211, and a light bar 219. Tilt sensor 211 and light bar 219 are combined such that both are disposed inside the same housing, namely housing 215.

Figure 2A:
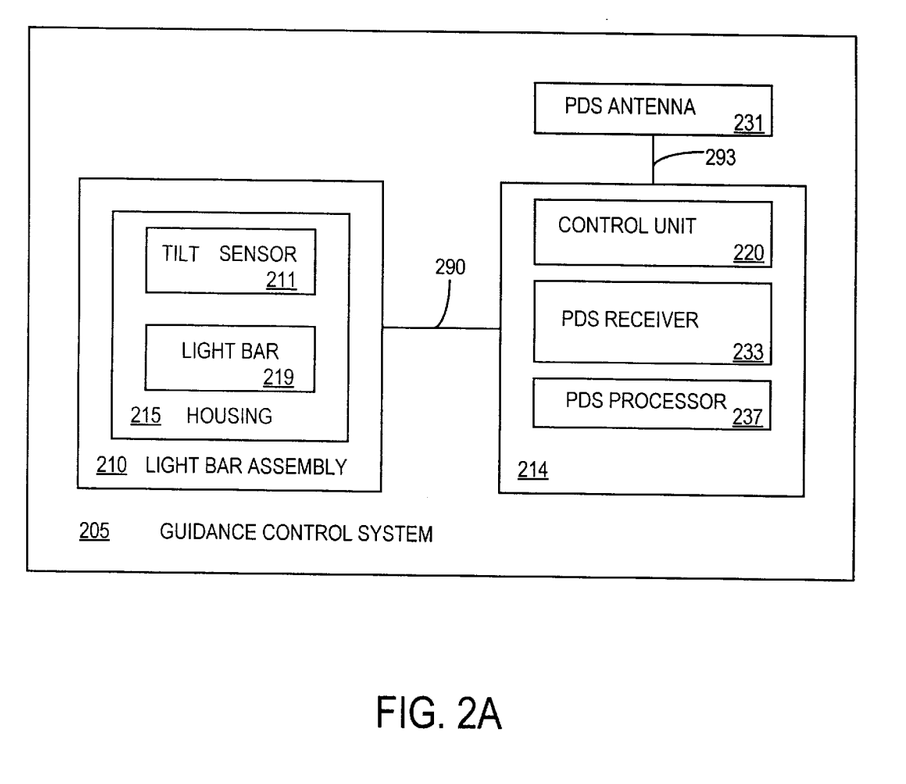
FIG. 2A is a schematic diagram depicting an alternative guidance control system that includes a light bar assembly in accordance with one embodiment of the present invention.

Referring now to FIG. 2A, an alternative embodiment is depicted as guidance control system 204. In this alternative embodiment, the control unit 220 is integrated with the PDS such that PDS processor 237 and PDS receiver 233 are disposed into a single housing 214. Housing 214 is coupled via cable 293 to PDS antenna 231. Housing 214 is also coupled via cable 290 to light bar assembly 210.

Figure 2B:
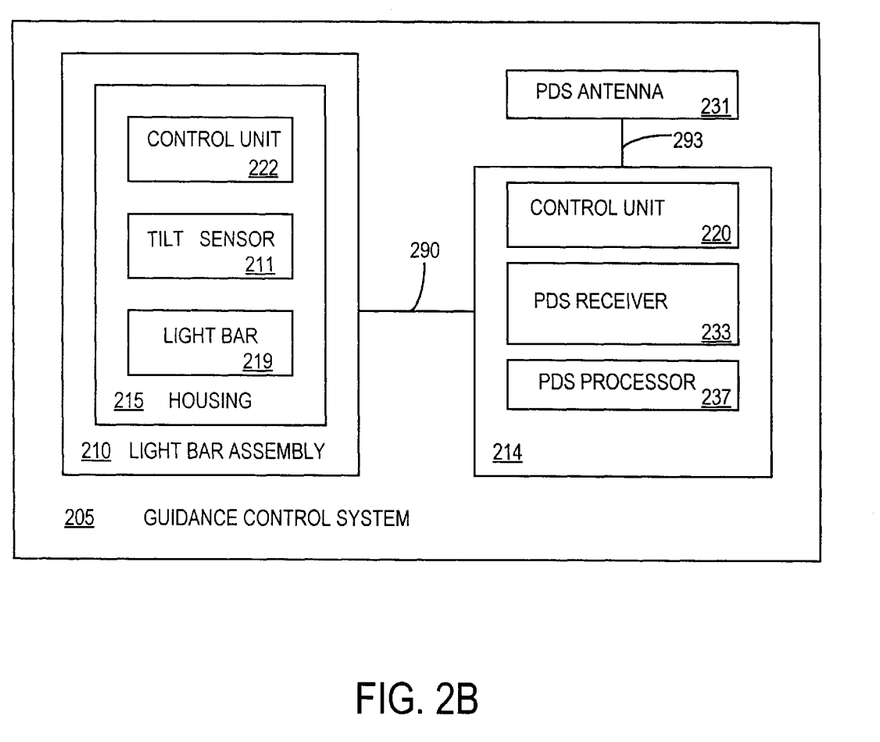
FIG. 2B is a schematic diagram depicting another alternative guidance control system that includes an alternative light bar assembly in accordance with one embodiment of the present invention.

Referring now to FIG. 2B, another alternative embodiment is depicted as guidance control system 203. This embodiment includes another control unit 222 in addition to control unit 220. In this embodiment, control unit 222 is integrated with light bar assembly 210. Thus, in the present embodiment, control unit 222, tilt sensor 211 and light bar 219 are housed together within light bar assembly 210. Light bar assembly 210 is coupled to housing 214 that includes control unit 220, PDS processor 237 and PDS receiver 233. PDS antenna 231 is coupled to housing 214 via cable 293.

Figure 2C:
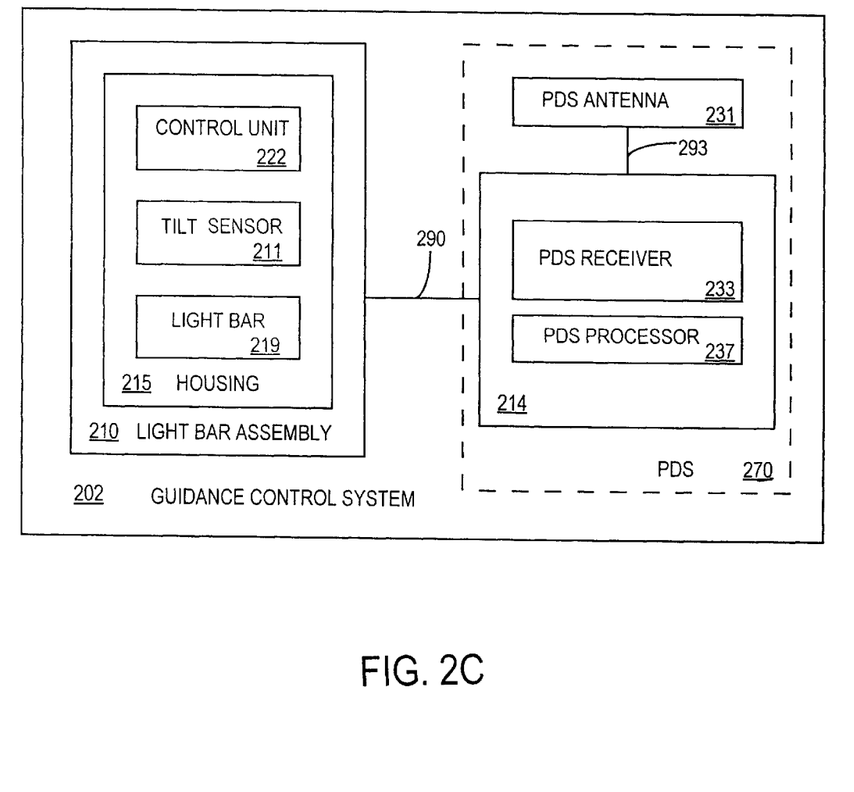
FIG. 2C is a schematic diagram depicting yet another alternative guidance control system in accordance with one embodiment of the present invention.

Referring now to FIG. 3C, yet another alternative embodiment is depicted as guidance control system 202. This embodiment includes control unit 222 that is disposed within housing 215. PDS processor 237 and PDS receiver 233 are disposed into a single housing 214 that is coupled to PDS antenna 231 via cable 293. Housing 214 is coupled via cable 290 to light bar assembly 210. PDS antenna 231, PDS receiver 233 and PDS processor 237 constitute PDS 270.

Referring to FIGS. 1, 2A, 2B and 2C, the components of guidance control systems 202–205 are described in terms of their functions. First, guidance control systems 202–205 are adapted to guide a vehicle, such as, for example, a tractor for agricultural purposes. Typically, the vehicle is guided along a path that is predetermined to run through adjacently arranged rows for planting and harvesting crops or spraying chemicals and nutrients.

Referring still to FIGS. 1, 2A, 2B and 2C, in the present embodiment of the present invention, light bar 219 includes lights that emit a light pattern that indicates the deviation of the vehicle from the adjusted travel path. A row of lights are selectively illuminated for forming a desired light pattern. Typically, these lights are implemented with LED's. Alternatively, other light sources such as, for example, light bulbs, flat panel displays, liquid crystal displays etc. are used.

Referring again to FIGS. 1, 2A, 2B and 2C, tilt sensor 211 is adapted to determine the attitude of the vehicle as the vehicle travels along the predetermined path. More specifically, tilt sensor 211 determines lateral tilt angle of the vehicle in relation to the path. With the lateral tilt angle as determined by tilt sensor 211, an adjust travel path is created in place of the predetermined travel path in order to chart a new course for the vehicle. This adjusted travel path compensates for any tilting errors that were introduced to guidance control systems 202–205 by the vehicle traveling along the predetermined path. In one embodiment, tilt sensor 211 is mounted horizontally with respect to the vehicle. A zero calibration number is then entered while the vehicle is on leveled surface such that small mounting angle irregularities are accounted for.

Referring still to FIGS. 1, 2A, 2B and 2C, PDS antenna 231 receives signals from a PDS. The received PDS signals are coupled to PDS receiver where the signals are demodulated to obtain position data. Using the received position data and the time that the PDS signals were received, PDS processor 237 determines the position of the vehicle.

Referring to FIGS. 1 and 2A, control unit 220 uses the determined position of the vehicle and the attitude determined by tilt sensor 211 to track the vehicle. Specifically, control unit 220 indicates the adjusted travel path to the vehicle operator through the use of light bar 219. Typically the software and/or hardware of control unit 220 is modified so as to accommodate the functions of tilt sensor 211.

Referring now to FIG. 2B, a light bar assembly 210 is shown that includes control unit 222 instead of control unit 220 to track the vehicle. Also, rather than control unit 220, control unit 222 is used instead to indicate the adjusted travel path to the vehicle operator through the use of light bar 219. However, alternatively, both control unit 222 and control unit 220 can be used for controlling the operation of guidance control system 203. By including a control unit into light bar assembly 210, the present invention allows for easy and inexpensive upgrades of existing hardware.

In the embodiment shown in FIG. 2C, control unit 222 uses the determined position of the vehicle and the attitude determined by tilt sensor 211 to track the vehicle. Specifically, control unit 222 indicates the adjusted travel path to the vehicle operator through the use of light bar 219. PDS 270 includes PDS antenna 231, PDS receiver 233 and PDS processor 237. PDS processor 237 supplies position data that is coupled to control unit 222.

Referring now to FIGS. 2B–C, with respect to both control unit 220 and control unit 222, any of a number of different hardware and software configurations can be used to control the operation of the guidance control system of the present invention. In one embodiment, control unit 222 and control unit 220 are application specific integrated circuit (ASIC) devices. Alternatively, control unit 220 and control unit 222 are microprocessors such as, for example, a MC 68AC908GP20 microprocessors manufactured by Motorola Inc. of Austin, Tex. Alternatively, other types of devices that allow for processing information such as microcontrollers etc. can be used. In one embodiment, a general purpose computer such as computer system 100 of FIG. 3 is used.

Figure 3:
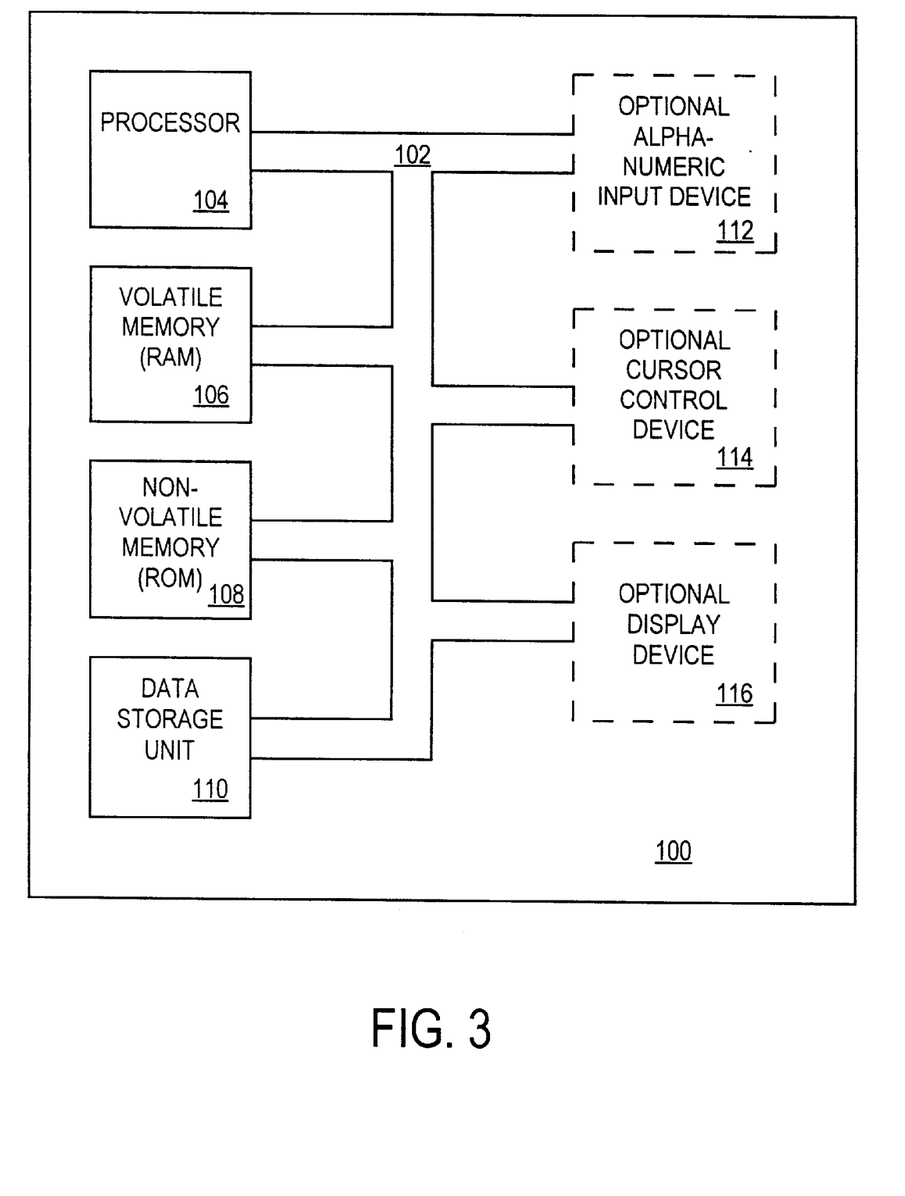
FIG. 3 is a generic computer system used in conjunction with a PDS processor in accordance with one embodiment of the present invention.

With reference now to FIG. 3, an exemplary computing system 100 included with the guidance control systems such as systems 202–205 of FIGS. 1–2C is depicted. Portions of the present method and system are comprised of computer-readable and computer-executable instructions which reside, for example, in computer-usable media of a computer system. It is appreciated that computer system 100 of FIG. 3 is exemplary only and that the present invention can operate within a number of different computer systems including general purpose networked computer systems, embedded computer systems, and stand alone computer systems. Additionally, computer system 100 of FIG. 3 is well adapted to having computer readable media such as, for example, a floppy disk, a compact disc, and the like coupled thereto. Such computer readable media is not shown coupled to computer system 100 in FIG. 3 for purposes of clarity.

System 100 of FIG. 3 includes an address/data bus 102 for communicating information, and a central processor unit 104 coupled to bus 102 for processing information and instructions. Central processor unit 104 may be an 80×86-family microprocessor. System 100 also includes data storage features such as a computer usable volatile memory 106, e.g. random access memory (RAM), coupled to bus 102 for storing information and instructions for central processor unit 104, computer usable nonvolatile memory 108, e.g. read only memory (ROM), coupled to bus 102 for storing static information and instructions for the central processor unit 104, and a data storage device 110 (e.g., a magnetic or optical disk and disk drive) coupled to bus 102 for storing information and instructions. System 100 of the present invention also includes an optional alphanumeric input device 112 including alphanumeric and function keys is coupled to bus 102 for communicating information and command selections to central processor unit 104. System 100 also optionally includes a cursor control device 114 coupled to bus 102 for communicating user input information and command selections to central processor unit 104. System 100 of the present embodiment also includes an optional display device 116 coupled to bus 102 for displaying information.

Referring still to FIG. 3, optional display device 116 of FIG. 3, may be a liquid crystal device, cathode ray tube, or other display device suitable for creating graphic images and alphanumeric characters recognizable to a user. Optional cursor control device 114 allows the computer user to dynamically signal the two dimensional movement of a visible symbol (cursor) on a display screen of display device 116. Many implementations of cursor control device 114 are known in the art including a trackball, mouse, touch pad, joystick or special keys on alphanumeric input device 112 capable of signaling movement of a given direction or manner of displacement. Alternatively, it will be appreciated that a cursor can be directed and/or activated via input from alphanumeric input device 112 using special keys and key sequence commands. The present invention is also well suited to directing a cursor by other means such as, for example, voice commands.

Figure 4:
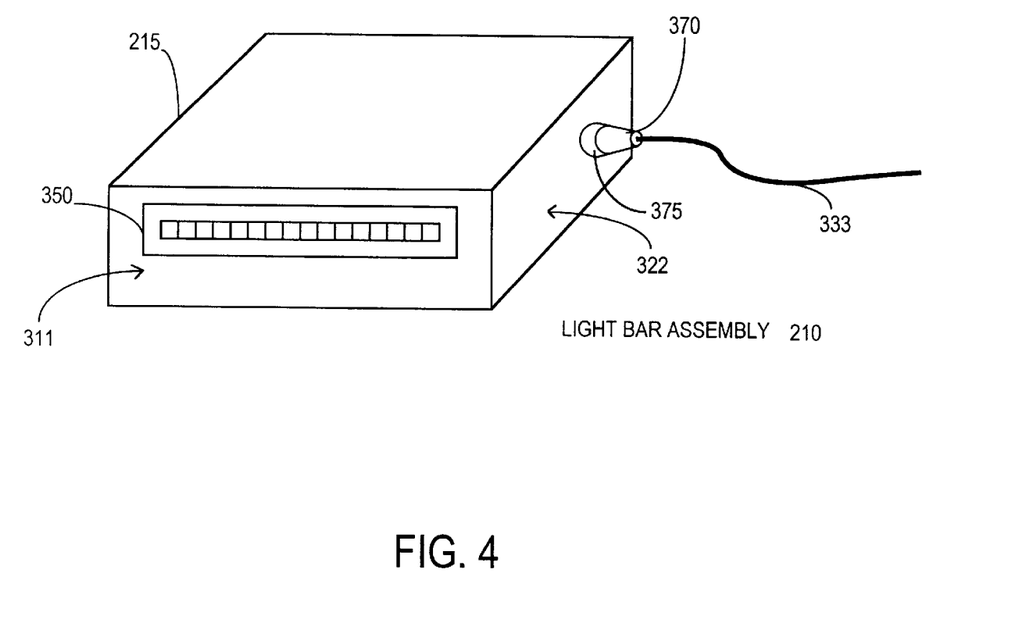
FIG. 4 depicts one embodiment of a light bar assembly from a three dimensional view in accordance with one embodiment of the present invention.
Figure 5A:
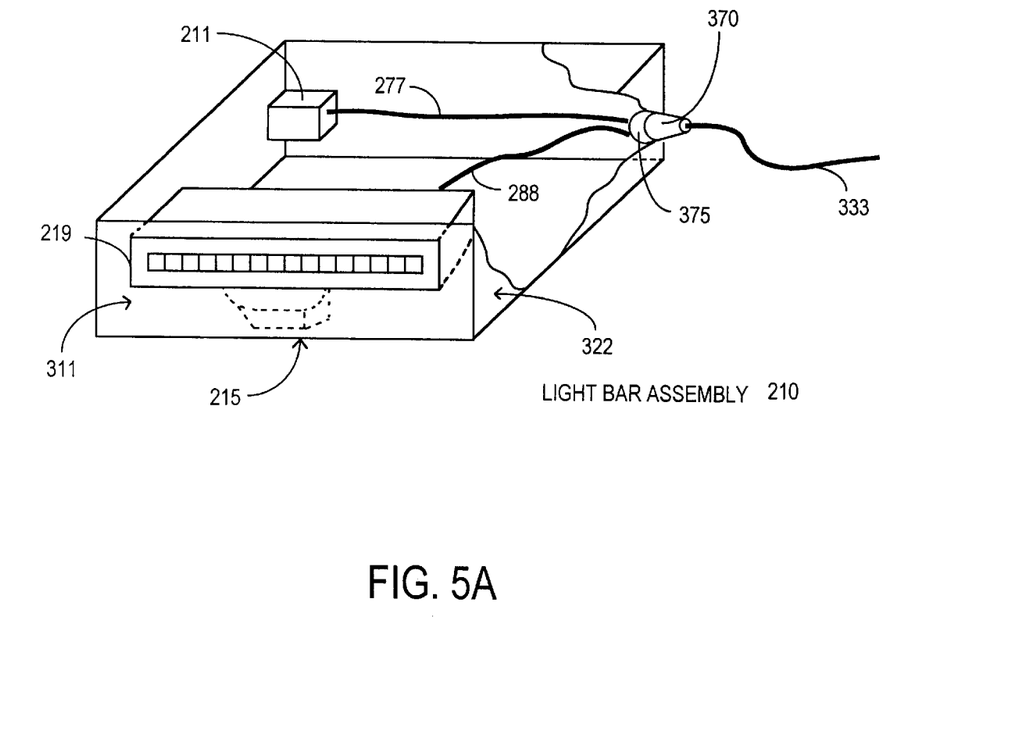
FIG. 5A depicts one embodiment of a light bar assembly that includes a light bar and a tilt sensor that are disposed within a housing of the light bar assembly in accordance with one embodiment of the present invention.
Figure 5B:
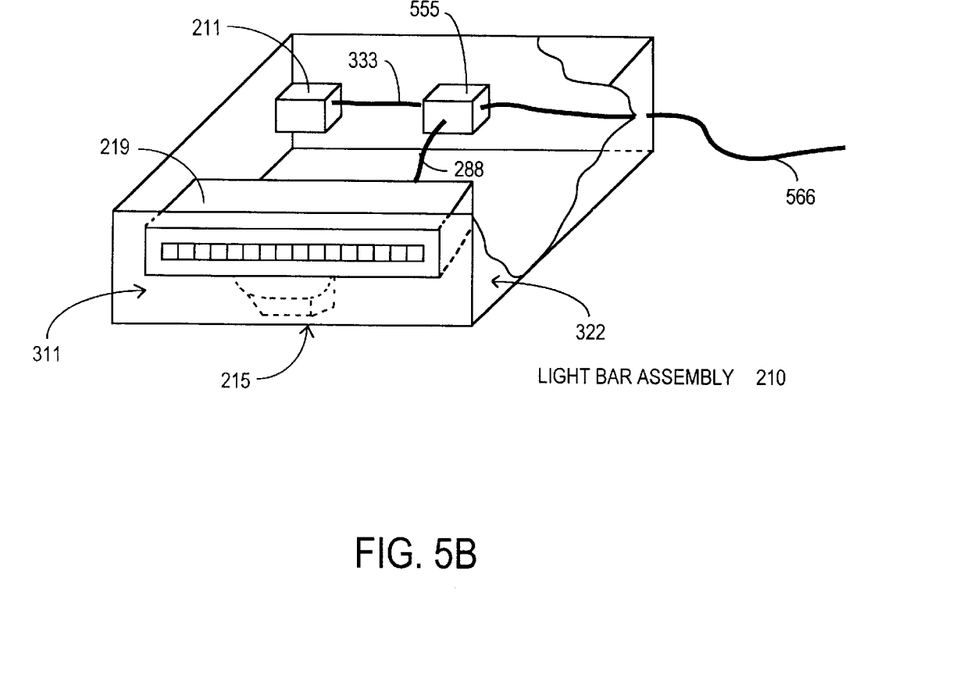
FIG. 5B depicts one embodiment of a light bar assembly that includes a light bar, a tilt sensor and a control unit that are disposed within a housing of the light bar assembly in accordance with one embodiment of the present invention.
Figure 5C:
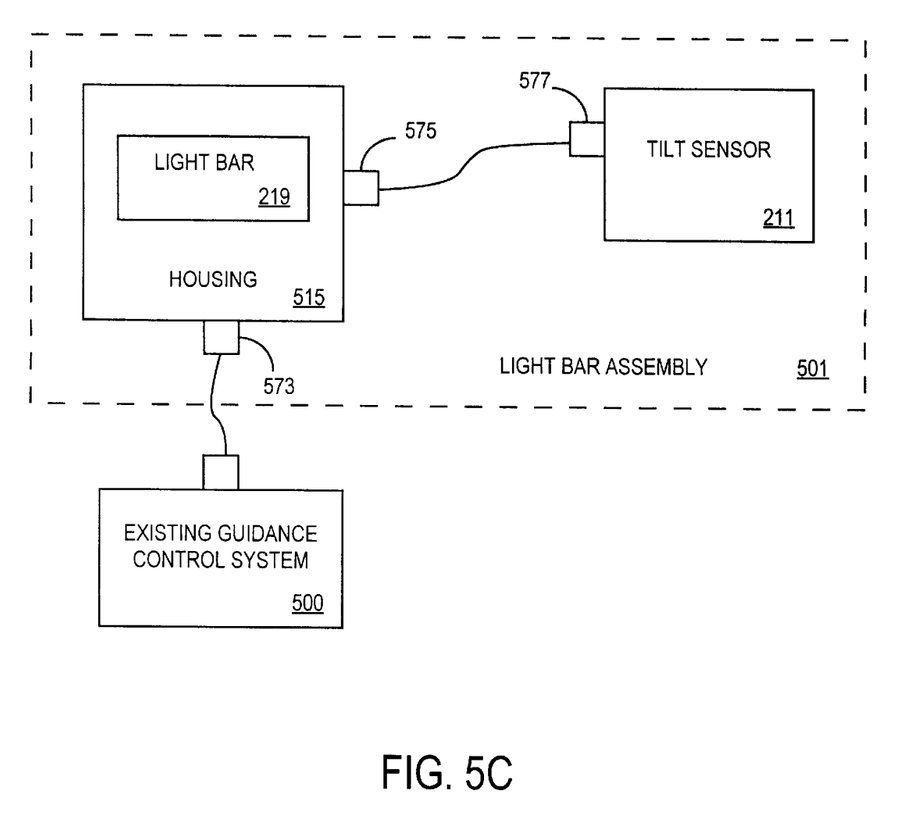
FIG. 5C depicts one embodiment of a light bar assembly that is well suited to work with an existing guidance control system in accordance with one embodiment of the present invention.
Figure 5D:
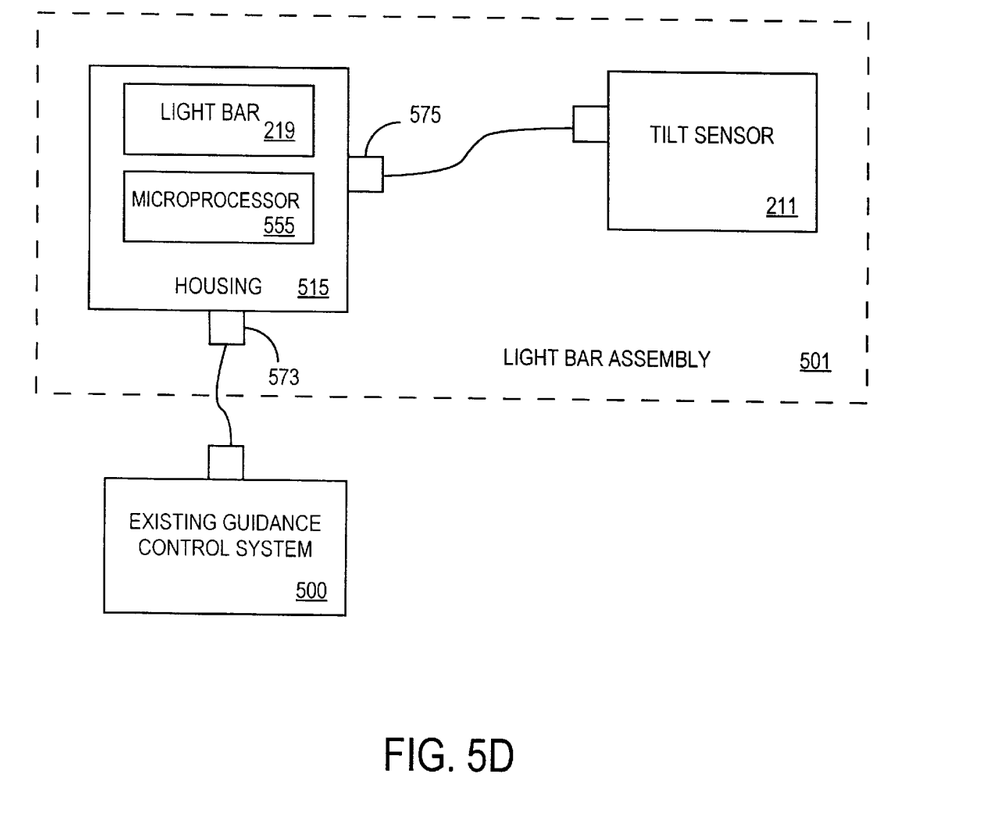
FIG. 5D depicts an alternative embodiment of a light bar assembly that is well suited to work with an existing guidance control system in accordance with one embodiment of the present invention.

With reference now to FIGS. 4–5D, several embodiments of light bar assembly 210 is shown. As shown in FIG. 4, side 311 of housing 215 has an opening 350 through which lights from light bar 219 are displayed. On side 322 of housing 215, a connector receptacle 375 is coupled to housing 215 such that portion of connector 370 extends from housing 215. Connector receptacle 375 allows cable wiring 333 from components inside of housing 215 to connect to other components outside of housing 215.

FIG. 5A depicts a cut-away view of one embodiment of light bar assembly 210. As shown, light bar 219 is disposed close to side 311 of housing 215. In this placement, lights from light bar 219 show through an opening on side 311 of housing 215. Cable 288 from light bar 219 and cable 277 from tilt sensor 211 are joined via connector receptacle 375 and connector 370 to a cable 333 for connection to other components of guidance control system 205. In one embodiment, cable 333 and connector 370 connect light bar assembly 210 to control unit 220.

With reference to FIG. 5B, one embodiment of light bar assembly 210 is depicted through a cut-away view in which control unit 222 of FIGS. 2B–C is a microprocessor 555. As shown, microprocessor 555 is included within housing 215. Furthermore, cable 333 from tilt sensor 211 and cable 288 from light bar 219 are separately coupled to microprocessor 555.

With reference to FIGS. 5C–D, embodiments of the present invention are shown in which tilt sensor 211 and light bar 219 are contained within separate housings that are coupled via cable. Light bar 219 includes two serial ports 573 and 575. Serial port 573 couples light bar 219 to existing guidance control system 501. Serial port 575 couples light bar 575 to tilt sensor 211. With serial ports 573 and 575 included as parts of light bar 219, a user can still use light bar 219 and tilt sensor 211 without modifying existing guidance control system 501 that has only one serial port.

A microprocessor (such as microprocessor 555 depicted in FIG. 5B) is included within light bar 219. In FIGS. 5B–D, any of a number of microprocessor can be used. In one embodiment, microprocessor 555 is a MC 68AC908GP20 microprocessors manufactured by Motorola Inc. of Austin, Tex.

Figure 6:
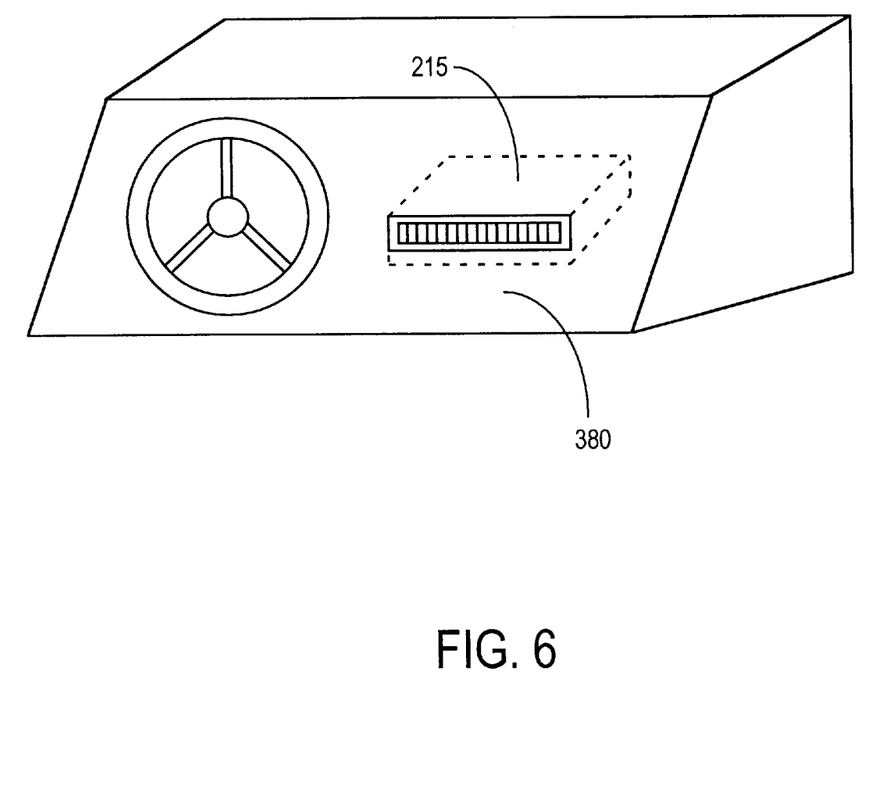
FIG. 6 depicts one embodiment of the light bar assembly mounted within a vehicle's control panel in accordance with one embodiment of the present invention.

Referring now to FIG. 6, in one embodiment of the present invention to be implemented in a vehicle, light bar assembly 210 is mounted within the control panel 380 of the vehicle. As depicted, side 311 of housing 215 is visible on control panel 380. As such, lights from light bar 219 are also visible such that a vehicle operator can be directed by light pattern formed from selectively illuminating the lights of light bar 219.

Figure 7:
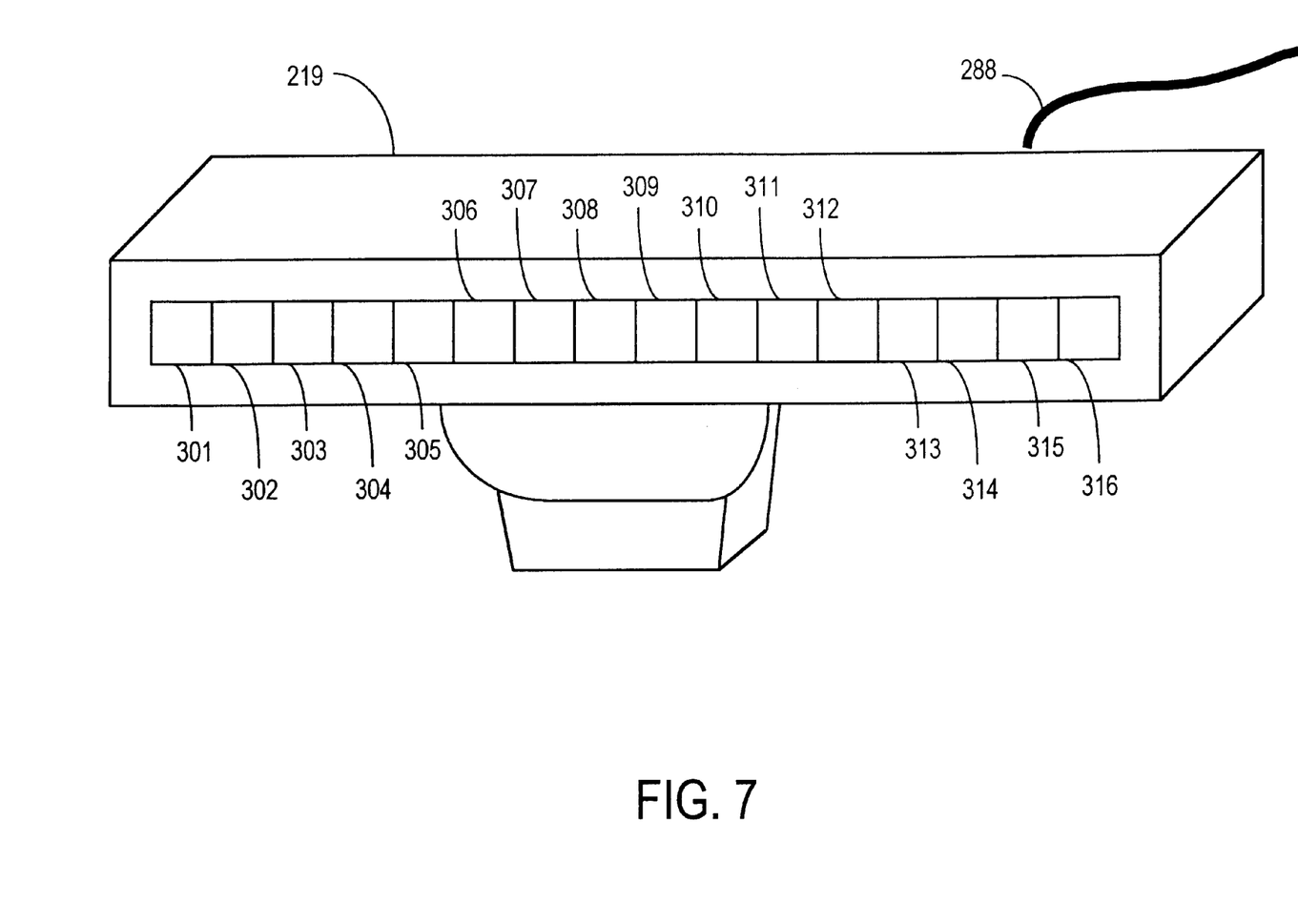
FIG. 7 depicts one embodiment of a light bar in accordance with one embodiment of the present invention.

With reference now to FIG. 7, an embodiment of light bar 219 is illustrated that includes LED's 301–316. LED's 301–316 are arranged in a row as shown. LED's 301–316 are selectively illuminated to form a light pattern for guiding a vehicle operator.

Figure 8:
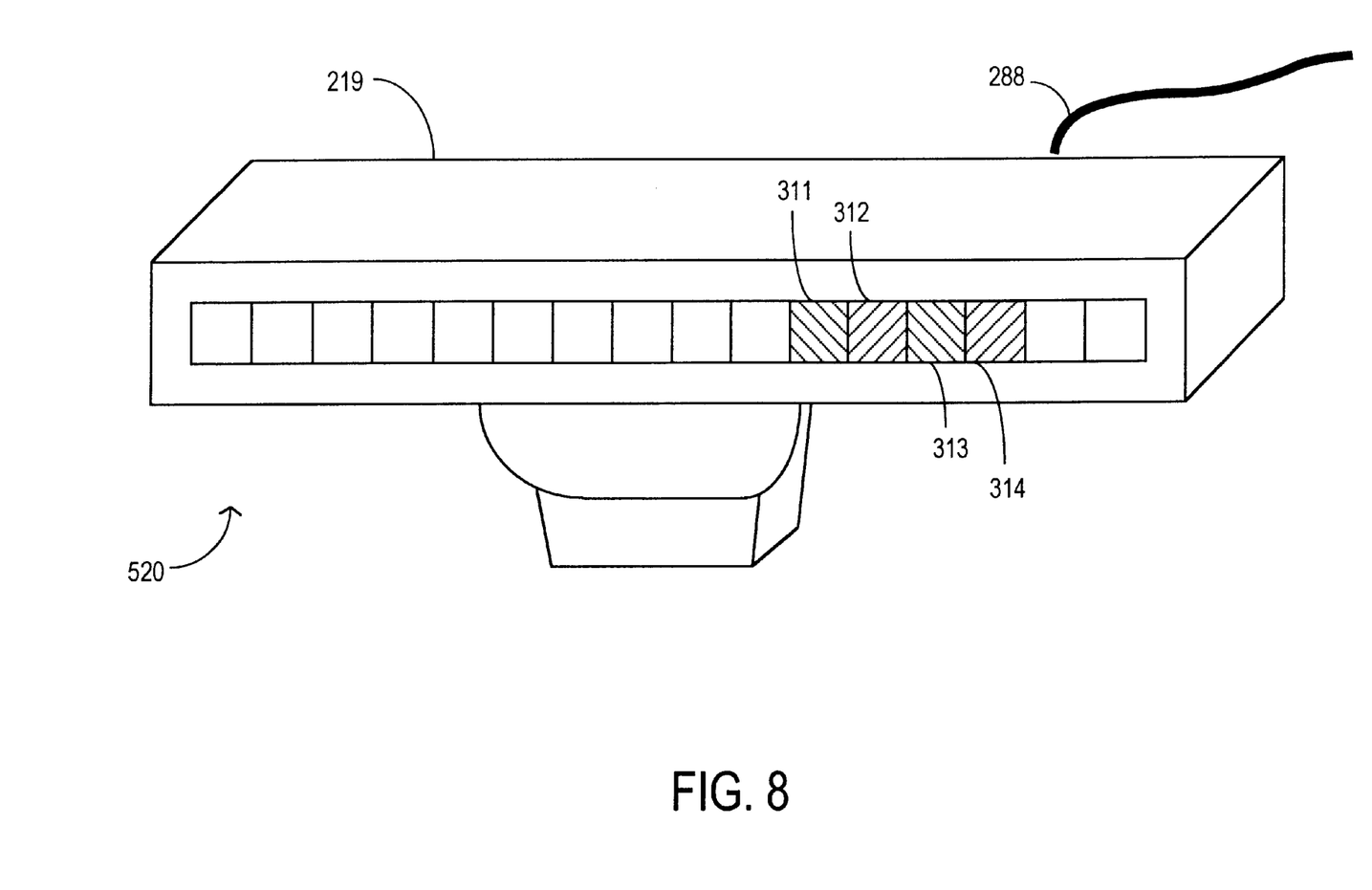
FIG. 8 depicts one light pattern as emitted by a light bar that indicates a vehicle's deviation from a desired path in accordance with one embodiment of the present invention.
Figure 9:
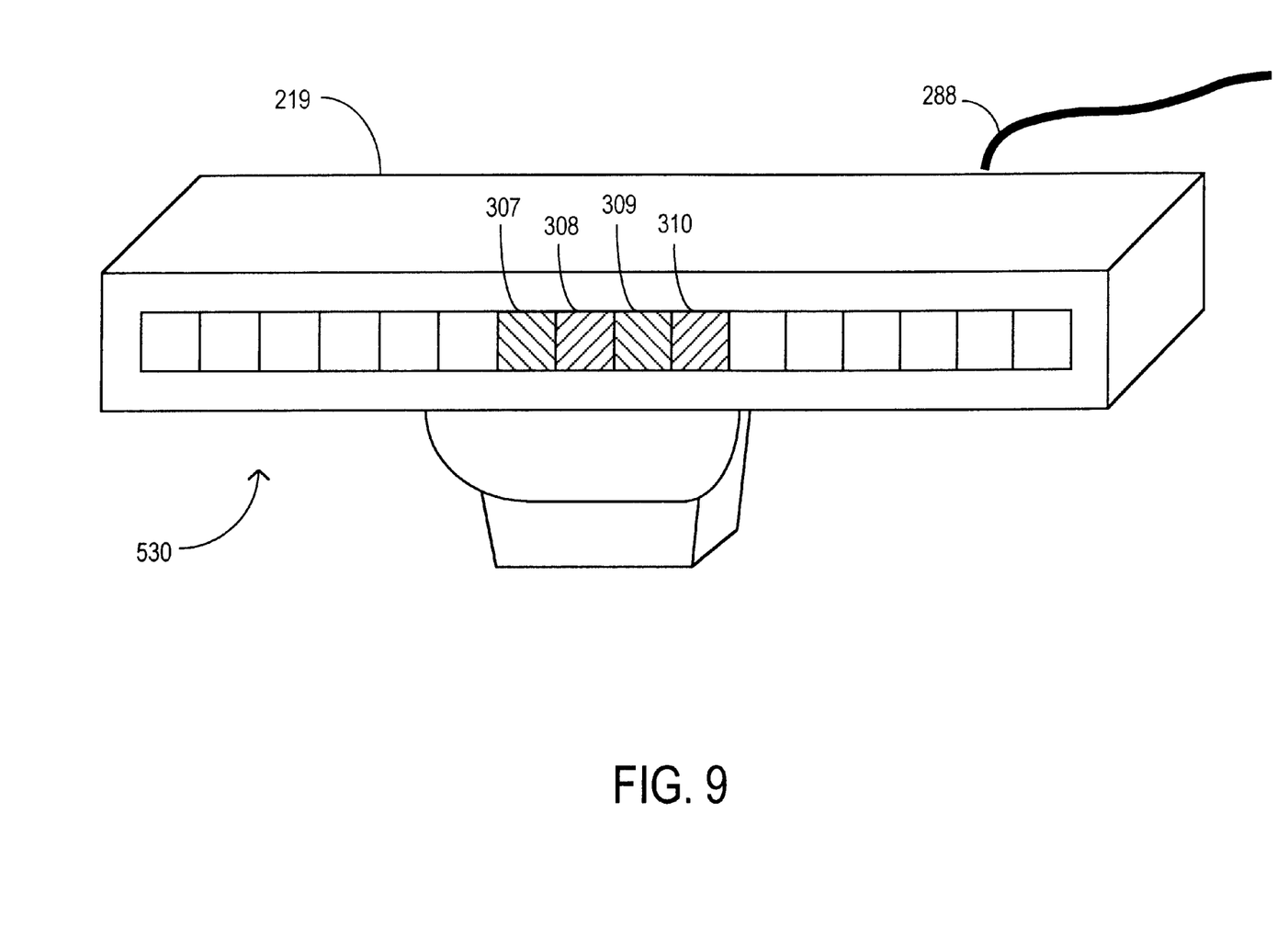
FIG. 9 depicts the centered light pattern emitted by a light bar that indicates a vehicle traveling on the desired adjusted travel path in accordance with one embodiment of the present invention.

For example, FIG. 8 depicts a light pattern 520 emitted by LED'S 311–314. In one embodiment, light pattern 520 (formed by the illumination of LED'S 311–314) indicates to the vehicle operator that the vehicle should be moved to the left to guide the vehicle along the adjusted travel path. As the vehicle operator moves the vehicle towards the left, in one embodiment, a new light pattern 530 is formed, as depicted in FIG. 9. For this new light pattern, LED's 307–310 are illuminated in place of LED's 311–314. The light pattern 530 appears to be centered, indicating that the vehicle is now moving along the correct travel path. However, the present invention is well suited to an embodiment in which light pattern 520 depicted in FIG. 8 indicates that the vehicle operator is to move the vehicle to the right in order to achieve the centered light pattern 530 depicted in FIG. 9.

As the vehicle operator follows the guidance indicated by light patterns from light bar 219, the present invention takes tilted surface into special consideration for guiding the movement of the vehicle on a tilted surface. In particular, when the vehicle travels on the tilted surface, the present invention compensates for the error caused by the tilt of the PDS antenna coupled to the vehicle. In addition, as the vehicle travels on a path having lateral tilt, the present invention compensates for the error caused by the shortened vertically viewed path width. As a result, surface tilt notwithstanding, the present invention advantageously avoids these two errors originated from the tilted surface, whereby the vehicle is guided along the true path intended (namely the adjusted travel path).

In the embodiments shown in FIGS. 1–9 of the present invention existing serial ports for light bar 219 and housing 215 can also be used for tilt sensor 211. Because light bar assembly 210 and light bar assembly 510 require only a single serial port connection, light bar assembly 210 and light bar assembly 501 can be advantageously used with an existing guidance control system. Thus, the present invention advantageously fulfills the existing need for incorporating a tilt sensor into a guidance control system while not requiring extra serial port to accommodate the tilt sensor.

Referring now to FIGS. 1–5B, by combining tilt sensor 211 with light bar 219 as depicted, no extra cable devoted to tilt sensor 211 is required. As such, no extra cable is exposed to outdoor weathering and electrical noise. Thus, the present invention advantageously fulfills the existing need for incorporating a tilt sensor into a guidance control system that does not require the tilt sensor to couple to the control unit using a dedicated cable that introduces extra electric noise.

Still referring to FIGS. 1–5B, by combining tilt sensor 211 and light bar 219 into a single housing, internalization of the tilt sensor into an existing guidance control system is not required as is required by some prior art systems. As such, no modification is necessary to the existing guidance control system. Thus, the present invention advantageously fulfills existing need for incorporating a tilt sensor into a guidance control system that does not require costly modification of the existing guidance control system.

Finally, by combining tilt sensor 211 and light bar 219 into a single housing, a user of any existing guidance control system not yet fitted with a tilt sensor can still reap the benefits of having tilt sensor 211 by adding light bar assembly 210. Thus, the present invention advantageously fulfills the existing need for incorporating a tilt sensor into a guidance control system that does not require a user to replace an existing control unit and GPS of a guidance control system not fitted with a tilt sensor.

Thus, the present invention fulfills the existing need for incorporating a tilt sensor into a guidance control system that does not require creation of extra serial port to accommodate the tilt sensor. Moreover, the present invention fulfills the existing need for incorporating a tilt sensor into a guidance control system that does not require the tilt sensor to couple to the control unit using a dedicated cable that introduces extra electric noise. Furthermore, the present invention fulfills existing need for incorporating a tilt sensor into an existing guidance control system that does not require costly modification of the control unit and the PDS for incorporating a tilt sensor. Finally, the present invention fulfills the existing need for incorporating a tilt sensor into a guidance control system that does not require an user to replace existing control unit and/or PDS of a guidance control system that does not include a tilt sensor.

The foregoing descriptions of specific embodiments of the present invention have been presented for purposes of illustration and description. They are not intended to be exhaustive or to limit the invention to the precise forms disclosed, and obviously may modifications and variations are possible in light of the above teaching. The embodiments were chosen and described in order best to explain the principles of the invention and its practical application, and to thereby enable others skilled in the art best to utilize the invention and various embodiments with various modifications as are suited to the particular uses contemplated. It is intended that the scope of the invention be defined by the Claims appended hereto and their equivalents.

What is claimed is:

1. A light bar assembly comprising:
   a) a housing;
   b) a light bar disposed in said housing, said light bar adapted to guide the movement of a vehicle; and
   c) a tilt sensor disposed in said housing, said tilt sensor adapted to determine the attitude of said vehicle.

2. The light bar assembly of claim 1, further comprising a connector receptacle coupled to said housing such that a portion of said connector receptacle extends from said housing.

3. The light bar assembly of claim 2, wherein said connector receptacle is a serial port.

4. The light bar assembly of claim 2, further comprising an electrical cable coupled to said connector receptacle, said connector receptacle coupled via electrical cables to said light bar and said tilt sensor.

5. The light bar assembly of claim 1, further comprising a control unit, wherein said control unit comprises a microprocessor, said microprocessor disposed in said housing.

6. The light bar assembly of claim 1, wherein said light bar is further comprised of a plurality of lights that are adapted to emit a light pattern that indicates the deviation of said vehicle from an adjusted travel path.

7. The light bar assembly of claim 6, wherein said plurality of lights are aligned as a row, and wherein said light pattern is formed by selectively illuminating ones of said plurality of lights.

8. The light bar assembly of claim 6, wherein said plurality of lights are comprised of a plurality of Light Emitting Diodes (LED's).

9. The light bar assembly of claim 1, wherein said tilt sensor is adapted to determine lateral tilt angle of said vehicle.

10. A guidance control system for a vehicle, said guidance control system comprising:
    a) a Position Determination System (PDS) adapted to determine the position of a vehicle;
    b) a light bar assembly including a housing, and a light bar, said light bar disposed in said housing and adapted to guide the movement of a vehicle, said light bar assembly also including a tilt sensor disposed in said housing, said tilt sensor adapted to determine the attitude of said vehicle; and
    c) a control unit coupled to-said PDS and said light bar assembly, said control unit adapted to determine an adjusted travel path for said vehicle using said determined attitude, and said control unit adapted to indicate said adjusted travel path using said light bar.

11. The guidance control system of claim 10, wherein said light bar is further comprised of a plurality of lights that are adapted to emit a light pattern that indicates the deviation of said vehicle from said adjusted travel path.

12. The light bar assembly of claim 11, wherein said plurality of lights are aligned as a row, and wherein said light pattern is formed by selectively illuminating ones of said plurality of lights.

13. The light bar assembly of claim 11, wherein said control unit is disposed in said housing.

14. The guidance control system of claim 10, wherein said tilt sensor indicates lateral tilt angle of said vehicle.

15. The guidance control system of claim 10, wherein said adjusted travel path adjusts for the tilt error caused by lateral tilt of said vehicle when said vehicle is laterally inclined.

16. The guidance control system of claim 10, wherein said PDS is comprised of:
    a Global Positioning System antenna (GPS antenna);
    a GPS receiver coupled to said GPS antenna; and
    a GPS processor coupled to said GPS receiver and adapted to determine the position of said vehicle.

* * * * *